(12) United States Patent
Lee et al.

(10) Patent No.: US 10,753,879 B1
(45) Date of Patent: Aug. 25, 2020

(54) METHOD FOR MEASURING BIS(2,4,4-TRIMETHYLPENTYL) PHOSPHINIC ACID CONCENTRATION BY ICP-OES

(71) Applicant: KOREA RESOURCES CORPORATION, Wonju-si (KR)

(72) Inventors: Seung Ho Lee, Ansan-si (KR); Young Hun Kim, Gwangmyeong-si (KR); Jeon Woong An, Wonju-si (KR); Youn Kyu Yi, Wonju-si (KR)

(73) Assignee: KOREA RESOURCES CORPORATION, Wonju-si (KR)

( * ) Notice: Subject to any disclaimer, the term of this patent is extended or adjusted under 35 U.S.C. 154(b) by 0 days.

(21) Appl. No.: 16/504,742

(22) Filed: Jul. 8, 2019

(51) Int. Cl.
  *G01N 21/73* (2006.01)
  *G01J 3/443* (2006.01)
  *G01N 1/28* (2006.01)
  *C22B 3/00* (2006.01)

(52) U.S. Cl.
  CPC ............. *G01N 21/73* (2013.01); *G01J 3/443* (2013.01); *G01N 1/28* (2013.01); *C22B 19/22* (2013.01); *G01N 2001/2893* (2013.01)

(58) Field of Classification Search
  CPC .. G01N 21/73; G01N 1/28; G01N 2001/2893; G01J 3/443; C22B 19/22
  See application file for complete search history.

(56) References Cited

PUBLICATIONS

EPA—SW-846 Test Method 6010D: Inductively Coupled Plasma-Optical Emission Spectrometry—2018 (Year: 2018).*
Azam—Investigation of Organic Losses in Solvent Extraction Circuit due to Solubility Degradation—Thesis—2010 (Year: 2010).*
Gandhi—Solvent Extraction Separation of Co from Ni and other metals with CYANEX 272—Talanta—1993 (Year: 1993).*

* cited by examiner

*Primary Examiner* — Benjamin R Whatley
*Assistant Examiner* — Jean Caraballo-Leon
(74) *Attorney, Agent, or Firm* — Cantor Colburn LLP

(57) ABSTRACT

Provided is a method for measuring the concentration of bis(2,4,4-trimethylpentyl) phosphinic acid using ICP-OES, the method including the steps of: (a) decomposing and dissolving an organic solvent into an acid; (b) preparing a phosphorus reference solution and producing a calibration curve using the phosphorus reference solution; and (c) measuring the phosphorus concentration (mg/L) of the solution of step (a) using the calibration curve of step (b) and calculating the concentration (v/v %) of bis(2,4,4-trimethylpentyl) phosphinic acid in the organic solvent using the phosphorus concentration.

12 Claims, 2 Drawing Sheets

(a) decomposing and dissolving an organic solvent into an acid

↓

(b) preparing a phosphorus reference solution and producing a calibration curve using the phosphorus reference solution

↓

(c) measuring the phosphorus concentration (mg/L) of the solution of step (a) using the calibration curve of step (b) and calculating the concentration (v/v%) of bis(2,4,4-trimethylpentyl) phosphinic acid in the organic solvent using the phosphorus concentration

METHOD FOR MEASURING BIS(2,4,4-TRIMETHYLPENTYL) PHOSPHINIC ACID CONCENTRATION BY ICP-OES

BACKGROUND OF THE INVENTION

1. Field of the Invention

The present invention relates to a method for measuring bis(2,4,4-trimethylpentyl) phosphinic acid concentration (% v/v) by inductively coupled plasma optical emission spectrometry (ICP-OES), and more particularly, to an analysis method for measuring the bis(2,4,4-trimethylpentyl) phosphinic acid concentration (% v/v) used as extractants in a Zn solvent extraction and a Co solvent extraction in Boleo process.

2. Description of the Related Art

Bis(2,4,4-trimethylpentyl) phosphinic acid (IONQUEST 290) has been used as extractants in a zinc solvent extraction process for extracting only zinc and a cobalt solvent extraction process for extracting only cobalt from the cobalt/zinc mixed solution recovered from cobalt/zinc extraction process (synergistic solvent extraction, hereinafter referred to as "DSX").

In order to increase the extraction efficiency, it is necessary to regularly measure the extractant's concentration of the organic solvent so as to maintain a constant concentration.

Further, since bis(2,4,4-trimethylpentyl) phosphinic acid is known to promote the function degradation of aliphatic hydroxy oxime used as an extractant in the DSX process, it should be checked whether or not bis(2,4,4-trimethylpentyl) phosphinic acid is present in DSX process from time to time.

Further, the titration method can be used to measure high-concentration bis (2,4,4-trimethylpentyl) phosphinic acid. However, there is a problem that only one sample can be analyzed at a time, and a lot of time is required to analyze one sample.

Further, since the titration method hardly distinguishes the end point from a target substance to be measured in a trace amount, it is difficult to measure the low-concentration bis(2,4,4-trimethylpentyl) phosphinic acid and to determine the presence of bis(2,4,4-trimethylpentyl) phosphinic acid.

SUMMARY OF THE INVENTION

An object of the present invention is to provide an effective analysis method for measuring the concentration of bis(2,4,4-trimethylpentyl) phosphinic acid used as extractants in a Zn solvent extraction process and a Co solvent extraction process and for confirming the presence of the presence thereof in the DSX process.

In order to solve the above problems, the present invention provides a method for measuring the concentration of bis(2,4,4-trimethylpentyl) phosphinic acid using ICP-OES, the method including the steps of: (a) decomposing and dissolving an organic solvent into an acid; (b) preparing a phosphorus reference solution and producing a calibration curve using the phosphorus reference solution; and (c) measuring the phosphorus concentration (mg/L) of the solution of the step (a) using the calibration curve of the step (b) and calculating the concentration (v/v %) of bis(2,4,4-trimethylpentyl) phosphinic acid in the organic solvent using the phosphorus concentration.

Further, the present invention provides the method using ICP-OES which is characterized by using the calibration curve of the step (b) to measure the phosphorus concentration (mg/L) of the solution produced in the step (a) and by calculating the concentration (v/v %) of bis(2,4,4-trimethylpentyl) phosphinic acid in the organic solvent using the phosphorus concentration (mg/L).

Further, the present invention provides the step (a) of decomposing and dissolving an organic solvent into an acid including: placing and mixing nitric acid and sulfuric acid in a beaker containing the organic solvent, covering the beaker with a watch glass, heating the beaker from a low temperature to a high temperature to decompose the mixture, and then cooling the beaker; adding and mixing nitric acid and perchloric acid to the cooled beaker, covering the beaker with the watch glass, heating the beaker again from a low temperature to a high temperature to decompose the mixture thoroughly, and then cooling the beaker; and adding nitric acid again after cooling, heating the beaker to dissolve the mixture thoroughly.

The present invention may maximize the extraction efficiency by measuring the concentration of bis(2,4,4-trimethylpentyl) phosphinic acid as an extractant in the zinc extraction process and the cobalt extraction process from time to time so as to maintain a constant concentration.

Further, the present invention may frequently measure the presence of bis(2,4,4-trimethylpentyl) phosphinic acid in the DSX process, thereby minimizing the function degradation of aliphatic hydroxy oxime which is an extractant in the DSX process due to bis(2,4,4-trimethylpentyl) phosphinic acid.

DETAILED DESCRIPTION OF THE PREFERRED EMBODIMENT

Hereinafter, a preferred exemplary embodiment of the present invention is described in more detail. In the following description of the present invention, a description of commonly known functions and configurations incorporated herein is omitted so as to avoid obscuring the concept of the present invention.

The terms of degree, such as "about", and "substantially" are used in the present specification in the sense of "at, or nearly at, when given the manufacturing and material tolerances inherent in the stated circumstances" and are used to prevent the unscrupulous infringer from unfairly taking advantage of the invention disclosure where exact or absolute figures are stated as an aid to understanding the invention.

Hereinafter, embodiments of the present invention are described in detail with reference to the accompanying drawings such that the present invention is readily apparent to those skilled in the art to which the present invention pertains. The present invention may be embodied in many different forms and is not limited to the embodiments described herein.

Figure 1:
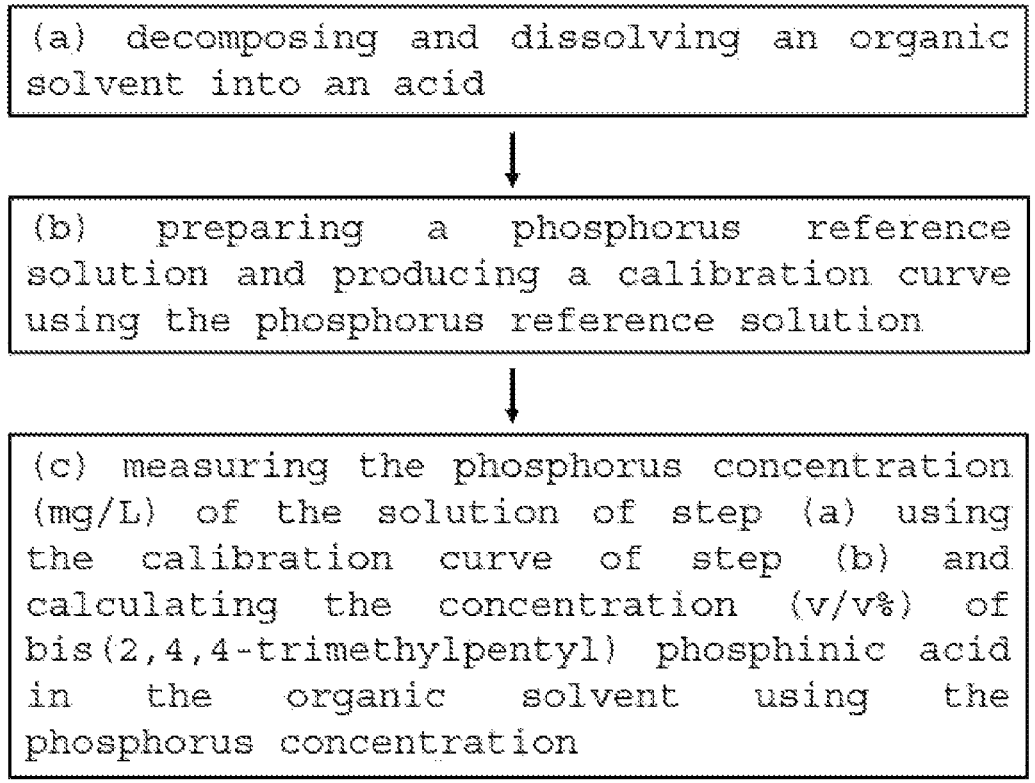
FIG. 1 is a flowchart illustrating a method for measuring bis(2,4,4-trimethylpentyl) phosphinic acid concentration by ICP-OES according to an embodiment of the present invention.

FIG. 1 is a flowchart illustrating a method for measuring bis(2,4,4-trimethylpentyl) phosphinic acid concentration by ICP-OES according to an embodiment of the present invention.

Referring to FIG. 1, the present invention includes the following steps:

(a) decomposing and dissolving an organic solvent into an acid; (b) preparing a phosphorus reference solution and producing a calibration curve using the phosphorus reference solution; and (c) measuring the phosphorus concentration (mg/L) of the solution of the step (a) using the calibration curve of the step (b) and calculating the concentration (v/v %) of bis(2,4,4-trimethylpentyl) phosphinic acid in the organic solvent using the phosphorus concentration.

The present invention is a method for measuring, by using ICP-OES, the concentration of bis(2,4,4-trimethylpentyl) phosphinic acid used as extractants in a zinc solvent extraction process for extracting only zinc and a cobalt solvent extraction process for extracting only cobalt from the cobalt/zinc mixed solution recovered from cobalt/zinc extraction process (DSX).

The organic solvent in the zinc solvent extraction and the cobalt solvent extraction includes 5% to 20% (v/v) of bis(2,4,4-trimethylpentyl) phosphinic acid and the remainder, kerosene, which is a diluent.

Further, although bis(2,4,4-trimethylpentyl) phosphinic acid is not used as an extractant in the organic solvent of the DSX process, the presence or absence of bis(2,4,4-trimethylpentyl) phosphinic acid should be checked and managed since bis(2,4,4-trimethylpentyl) phosphinic acid is known to promote function degradation of aliphatic hydroxy oxime used as an extractant in the DSX process.

Step (a) is a process of decomposing the organic solvent used in the zinc solvent extraction, the cobalt solvent extraction and the DSX process in order to measure phosphorus contained in the organic solvent by ICP-OES.

Step (b) is a process of producing a calibration curve for measuring phosphorus concentration of the solution prepared in step (a) by ICP-OES. Herein, the concentration range of the phosphorus reference solution for preparing the calibration curve is approximately 1 mg/L to 100 mg/L.

Further, the calibration curve can be expressed as a linear function graph of the intensity change according to the concentration change of the phosphorus reference solution.

In step (c), the solution prepared in step (a) is measured by ICP-OES. The intensity is applied to a graph of the linear function of the calibration curve prepared in step (b) to determine the concentration (mg/L) of phosphorus. The concentration value is used to calculate the concentration (% v/v) of bis(2,4,4-trimethylpentyl) phosphinic acid in the zinc extraction process, the cobalt extraction process and the DSX process.

Experimental Example

Method for Measuring Bis(2,4,4-Trimethylpentyl) Phosphinic Acid Concentration (% v/v) by ICP-OES 1. Step of Decomposing and Dissolving an Organic Solvent into an Acid First, in step (a), water was removed by oil/water separation using a separatory funnel in order to remove water of the organic solvent of the zinc extraction process, the cobalt extraction process and the DSX.

3 mL of the water-removed organic solvents of the zinc extraction process, the cobalt extraction process and the DSX, were transferred to 250 mL beakers, respectively.

In particular, since the presence of bis (2,4,4-trimethylpentyl) phosphinic acid is important in the case of DSX organic solvents, 3 mL of mixed solution containing aliphatic hydroxy oxime and neodecanoic acid as DSX extractants and kerosene as a diluent was transferred to a separate 250 mL beaker. Then the same procedure was followed. These are used to distinguish between signal and noise in ICP-OES measurements for low concentration solutions.

In addition, 2 mL of nitric acid and 5 mL of sulfuric acid were added to the above 250 mL beaker. The mixture was shaken, covered with a watch glass, and then heated on a heating plate from a low temperature to a high temperature.

After sufficiently heating to generate sulfuric acid fume, the beaker was cooled down by removing it from the heating plate.

2 mL of nitric acid and 5 mL of perchloric acid were placed on the cooled beaker. The mixture was shaken, covered with a watch glass, and then heated on a heating plate from a low temperature to a high temperature.

After visual confirmation of complete decomposition of organic matter, the beaker was removed from the heating plate and cooled down.

After cooling, 5 mL of nitric acid was placed on the beaker. The mixture was dissolved by heating on a low-temperature heating plate.

After cooling, the dissolved solution was transferred to a 100-mL volumetric flask, and then distilled water was used to adjust the volume to 100 mL.

2. Step of Preparing a Phosphorus Reference Solution and Producing a Calibration Curve Using the Phosphorus Reference Solution A high concentration phosphorus reference material (1000 mg/L) was diluted to prepare the reference solution for preparing a calibration curve, and the concentration of reference solution was 1 mg/L, 10 mg/L, 50 mg/L and 100 mg/L, respectively.

Figure 2:
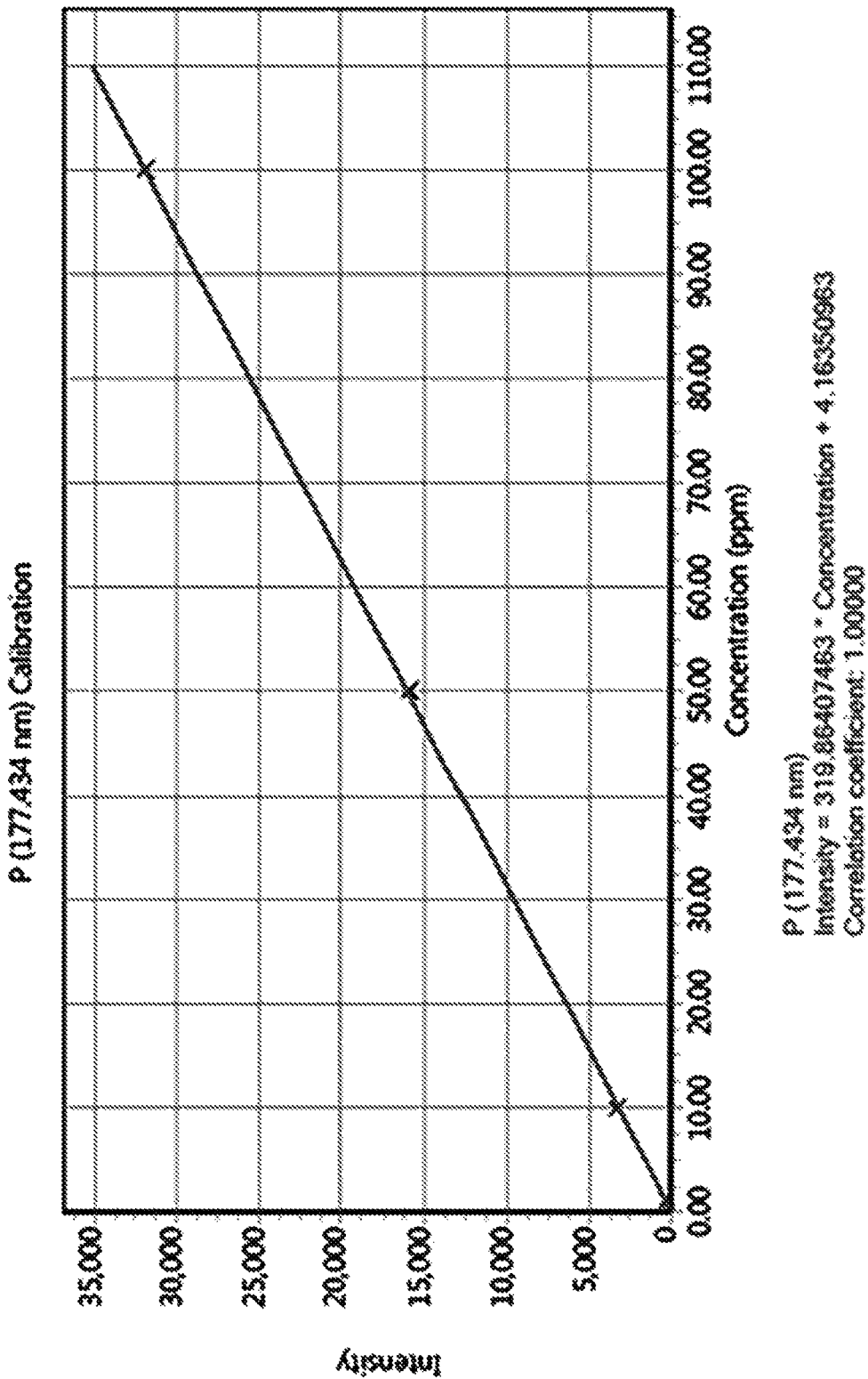
FIG. 2 a graph of a calibration curve generated according to an embodiment of the present invention.

The prepared reference solution was measured by ICP-OES. A calibration curve (FIG. 2), which is a linear function graph relating to the concentration (mg/L) and the intensity of the reference solution was prepared as shown in Table 1.

TABLE 1

| Standard | Intensity | Method concentration | Calculation concentration | % Error |
|---|---|---|---|---|
| Blank | 4.16 | 0.00 | 0.00 | N/A |
| P1 PPM | 338.18 | 1.00 | 1.04 | 4.42 |
| P10 PPM | 3259.88 | 10.00 | 10.18 | 1.78 |
| P50 PPM | 15951.30 | 50.00 | 49.86 | 0.29 |
| P100 PPM | 32007.70 | 100.00 | 100.05 | 0.05 |

3. Step of Measuring the Phosphorus Concentration (Mg/L) of the Solution Prepared in Step 1 Using the Calibration Curve of Step 2 and Calculating the Concentration (v/v %) of Bis(2,4,4-Trimethylpentyl) Phosphinic Acid in the Organic Solvent Using the Phosphorus Concentration The subject of the measurement material includes all organic solutions containing bis(2,4,4-trimethylpentyl) phosphinic acid. Therefore, the subject includes the organic solvent in the actual zinc extraction process, the organic solvent in the cobalt extraction process, and the organic solvent in the DSX process for confirming the presence or absence of bis (2,4,4-trimethylpentyl) phosphinic acid. However, an organic solvent containing phosphorus and its compound other than bis(2,4,4-trimethylpentyl) phosphinic acid is not used for the analysis.

The bis(2,4,4-trimethylpentyl) phosphinic acid as the measurement substance is as shown in Table 2 below.

TABLE 2

| Extractant | Purity (%) | Specific gravity |
|---|---|---|
| bis(2,4,4-trimethylpentyl) phosphinic acid | >95 | 0.918 |

A 100 mL solution prepared in step 1 of decomposing and dissolving the organic solvent into an acid was measured by ICP-OES, and the intensity of the solution was applied to a linear function of the calibration curve generated in step 2 of preparing the phosphorus reference solution and producing the calibration curve using the phosphorus reference solution to determine the phosphorus concentration (mg/L).

TABLE 3

| Item | Intensity | Concentration (mg/L) | Phosphorus concentration of organic solvent (mg/L) | Bis (2,4,4-trimethylpentyl) phosphinic acid concentration of organic solvent (mg/L) | Bis(2,4,4-trimethylpentyl) phosphinic acid concentration of organic solvent (% v/v) |
|---|---|---|---|---|---|
| Example 1 | 15171.00 | 47.42 | 17218.42 | 161453.68 | 16.15 |
| Example 2 | 8739.61 | 27.31 | 9916.39 | 92984.01 | 9.30 |

The concentration (v/v %) of bis(2,4,4-trimethylpentyl) phosphinic acid is calculated by the following Formulas 1 to 3 using the concentration of phosphorus measured.

[phosphorus concentration of solution (mg/L)×dilution ratio]÷specific gravity of bis(2,4,4-trimethylpentyl) phosphinic acid=phosphorus concentration of organic solvent (mg/L)  [Formula 1]

phosphorus concentration of solution (mg/L)×[molecular weight of bis(2,4,4-trimethylpentyl) phosphinic acid÷atomic weight of phosphorus] =concentration of bis(2,4,4-trimethylpentyl) phosphinic acid (mg/L)  [Formula 2]

concentration of bis(2,4,4-trimethylpentyl) phosphinic acid of organic solvent (mg/L)÷ [1000000/100]=concentration of bis(2,4,4-trimethylpentyl) phosphinic acid of organic solvent (% v/v)  [Formula 3]

The features and other advantages of the present invention as described above will become more apparent from the following embodiment. The following embodiment should not be construed as restricting or limiting the scope of protective scope of the present invention.

What is claimed is:

1. A method for measuring the concentration of bis(2,4,4-trimethylpentyl) phosphinic acid using inductively coupled plasma optical emission spectrometry, the method comprising the steps of:
   (a) decomposing and dissolving an organic solvent into an acid to produce a solution;
   (b) preparing a phosphorus reference solution and producing a calibration curve b_y inductively coupled plasma optical emission spectrometry using the phosphorus reference solution; and
   (c) measuring an intensity of phosphorus according to inductively coupled plasma optical emission spectrometry, determining a phosphorus concentration (mg/L) of the solution of step (a) using the calibration curve of step (b), and calculating the concentration (v/v %) of bis(2,4,4-trimethylpentyl) phosphinic acid in the organic solvent using the phosphorus concentration according to Formula 1 concentration (v/v %) of bis(2,4,4-trimethylpentyl) phosphinic acid in the organic solvent=((phosphorus concentration of solution (mg/L)×dilution ratio)÷specific gravity of bis(2,4,4-trimethylpentyl) phosphinic acid)×(molecular weight of bis(2,4,4-trimethylpentyl) phosphinic acid÷ atomic weight of phosphorus)/(1,000,000/100).  Formula 1

2. The method of claim 1, wherein the step (a) of decomposing and dissolving an organic solvent into an acid includes:
   placing and mixing nitric acid and sulfuric acid in a beaker containing the organic solvent, covering the beaker with a watch glass, heating the beaker from a low temperature to a high temperature to decompose the mixture, and then cooling the beaker;
   adding and mixing nitric acid and perchloric acid to the cooled beaker, covering the beaker with the watch glass, heating the beaker again from a low temperature to a high temperature to decompose the mixture thoroughly, and then cooling the beaker; and
   adding nitric acid again after cooling, heating the beaker to dissolve the mixture thoroughly.

3. The method of claim 1, wherein the step (a) of decomposing and dissolving an organic solvent into an acid comprises using perchloric acid to produce the solution.

4. The method of claim 1, wherein the step (a) of decomposing and dissolving an organic solvent into an acid comprises using nitric acid, sulfuric acid, and perchloric acid to produce the solution.

5. The method of claim 1, wherein the step (a) of decomposing and dissolving an organic solvent into an acid comprises:
   heating a mixture comprising nitric acid, sulfuric acid, and the organic solvent,
   adding nitric acid and perchloric acid to the mixture comprising nitric acid, sulfuric acid, and the organic solvent to form a second mixture,
   heating the second mixture to form a third mixture,
   adding nitric acid to the third mixture to form a fourth mixture, and
   heating the fourth mixture.

6. The method of claim 1, wherein the step (a) of decomposing and dissolving an organic solvent into an acid comprises:
   heating a mixture comprising nitric acid, sulfuric acid, and the organic solvent to form a heated mixture,
   cooling the heated mixture to form a cooled mixture,
   adding nitric acid and perchloric acid to the cooled mixture to form a second mixture, heating the second mixture to form a heated second mixture, cooling the heated second mixture to form a cooled second mixture, adding nitric acid to the cooled second mixture to form a third mixture, and heating the third mixture.

7. The method of claim 1, further comprising removing water from the organic solvent prior to the step (a) of decomposing and dissolving an organic solvent into an acid comprises to produce the solution.

8. The method of claim 7, wherein removing water from the organic solvent comprises oil/water separation.

9. The method of claim 1, wherein the organic solvent comprises an organic solvent from a solvent extraction process.

10. The method of claim 9, wherein the organic solvent comprises an organic solvent from a zinc solvent extraction process.

11. The method of claim 9, wherein the organic solvent comprises an organic solvent from a cobalt solvent extraction process.

12. The method of claim 9, wherein the organic solvent comprises an organic solvent from a synergistic solvent extraction process.

* * * * *